Patented May 26, 1942

2,284,080

UNITED STATES PATENT OFFICE 2,284,080

MOTOR FUEL ADJUVANT

William J. Backoff, Norman D. Williams, John F. O'Loughlin, Harry L. Moir, and John S. Yule, Chicago, Ill., assignors to The Pure Oil Company, Chicago, Ill., a corporation of Ohio No Drawing. Application October 6, 1938, Serial No. 233,612

9 Claims. (Cl. 44—9)

This invention relates to certain new and useful improvements in gum solvents for use in automotive engines and other machinery, but particularly for use in connection with fuels to be used in internal combustion engines as, for example, automotive engines.

In the operation of internal combustion engines there is invariably formed as a result of the conditions of combustion, a deposit in the combustion chamber of the cylinders, on the piston heads, around the valves and also on the spark plugs, which materially interferes with proper and efficient operation of the motor. In the combustion zone the deposit causes what is commonly known as knocking or detonation of the fuel charge in the cylinders. Similar deposits cause the piston rings and valves to stick. This deposit is commonly referred to as carbon although it is not composed wholly of carbon but includes other material as mineral matter from road dust drawn into the carburetor, metallic particles, gum and rust, etc. The so-called carbon element of the deposit is largely a result of incomplete combustion of fuel and carbonization of mineral oil. The incomplete combustion of fuel not only accounts for carbon deposition but undoubtedly also accounts for the deposit of gum-like material as well, which under the prevailing conditions may be in a form ranging from a fairly soft gum to a hard, brittle varnish-like substance. For purposes of convenience, the deposits of materials in internal combustion engines, described in the foregoing paragraph, will be referred to as carbon deposits.

It has also been noted that motor fuels, such as the usual gasolines now on the market, form a deposit of a gum-like residue in the intake system of internal combustion engines. This deposit is usually most noticeable in the intake manifold and around the intake valves, and is generally referred to as gum. This deposition of gum is very objectionable and may be the cause of the improper functioning, or failure to function, of the intake valves whereby the operating efficiency is materially impaired.

It is an object of this invention to provide a composition which is adapted to be used in conjunction with gasoline or other fuels in internal combustion engines. When this gasoline-solvent fuel mixture is used in internal combustion engines, it effectively minimizes the tendency toward formation of carbon and gum deposits in both the intake system and combustion zone and in those engines where deposits of carbon and gum are already present and are interfering with efficient operation, the deposits are substantially decreased and/or removed, restoring the engine to higher operating efficiency.

Another object of the invention is to provide a composition which is adapted to be injected directly into internal combustion engines for the purpose of removing gum and carbon deposits.

Still another object of the invention is to provide a gum solvent which can be used in connection with lubricating oil to remove and minimize gum and carbon deposits in certain parts of internal combustion engines.

A further object of the invention is to provide a gum solvent which can be used in conjunction with industrial lubricating oils to remove and inhibit gum deposition on machinery parts.

Further objects of the invention will appear from the following description.

It is known that a number of substances have been used in the past to remove or prevent deposits of carbon and gum in internal combustion engines. As a result of laboratory investigation and of commercial usage, it has been found that the materials disclosed in the prior art fail to effectively remove or minimize the deposits from the intake system and the combustion zone.

In an effort to overcome the deficiencies of known removers, frequently referred to as solvents, resort has been had to those materials which have a strong and powerful action, such as halogenated organic compounds. Not only does the use of such materials frequently result in the corrosion of engine parts, but these materials do not sufficiently remove or inhibit carbon and gum to warrant their use. The effect of simply increasing the amount of solvent additive has also been tried but this change generally results in increasing the deposit in the combustion zone, apparently as a result of carbonization of the solvent itself or as a result of the effect of the solvent action in the intake system, causing removal of the deposit there and the carrying of the deposit into the combustion zone where, due to the difference in conditions, such as temperature and pressure, deposition of material resulted and the deposit in the combustion zone increased.

We have now discovered that certain combinations of materials, when used in definite proportions and amounts in motor fuel, will remove carbon and gum deposits already present and will inhibit or minimize the further deposition of carbon and gum in both the intake system and combustion zone. While the nature of the solvent effect of the proposed combinations is such as to be classed as very active, under the conditions which it is used, yet the material is non-corrosive and does not injure in any way the metal parts with which it comes in contact. The composition in accordance with this invention is composed of: (1) a refined mineral oil having a boiling range higher than kerosene distillate and ranging in viscosity up to 500 seconds Saybolt Universal at 100° F.; and (2) a compound or a mixture of compounds boiling above approximately 350° F. which may or may not have gum solvent properties at ordinary temperatures but increasingly improved solvency for gum at increasingly elevated temperatures up to the boiling point thereof and which may be selected from the group consisting of esters of aliphatic dicarboxylic acids; esters of aromatic acids, cyclic, including aromatic, ketones, and aliphatic alcohols. Examples of group 2 are esters of phthalic acid such as methyl phthalate, dibutyl phthalate and amyl phthalate; esters of benzoic acid such as benzyl benzoate, ethyl benzoate and butyl benzoate; esters of tartaric acid such as dibutyl tartrate; aromatic ketones such as benzophenone, acetophenone and furfuralacetone; and mono-hydroxy alcohols such as octyl alcohol. The proportions of the various compounds indicated which may be used in such combinations of solvent materials must, for satisfactory results, be maintained within certain definite ratios but may be varied within the limits of approximately 50% to 90% of mineral oil, 50% to 10% of one or more compounds from group 2. It is only by maintaining the composition between these limits that effective diminution of deposits in both the intake system and combustion zone may be accomplished. The composition is preferably used in admixture with the motor fuel although the constituents of the composition may be injected directly into the intake system of the motor separately or admixed with each other. A maximum of 5% and usually not over 1% of solvent, based on the volume of motor fuel, is sufficient. In general, it has been found that from 0.1% to 0.5% of solvent gives satisfactory results. The amount of solvent to be used will vary within the limits specified with different engines and with the type of service to which the engine is subjected. It has been found that deviation from the proportions specified not only diminishes the efficacy of the solvents but in some cases increases the deposit in the combustion zone.

As a specific example of a preferred combination of solvent additive, eighty parts by volume of a highly refined white petroleum oil having the following tests:

SU viscosity at 100° F. _____ 70–75
Color, Saybolt_____ +25
Flash (C. O. C.) _____°F__ 350–360
Fire _____°F__ 400–420 is blended with ten parts dibutyl phthalate and ten parts ethyl benzoate. This mixture may be added to gasoline in the proportion of 99.8% gasoline and 0.2% solvent mixture. When this gasoline-solvent fuel mixture is used in internal combustion engines, it effectively minimizes the tendency toward formation of gum and carbon deposits in both the intake system and combustion zone and in those engines where deposits of gum and carbon are already present and are interfering with efficient operation, the deposits are substantially decreased, restoring the engine to higher operating efficiency.

The following tabulation of data indicates the nature of the results obtained by the use of combinations of solvents within the scope of our invention:

| | | Oil free deposit in combustion chamber | Deposit in intake system | Total deposit |
|---|---|---|---|---|
| | | Grams | Grams | Grams |
| 1 | Blank | 32.4 | 21.7 | 54.1 |
| | 0.18% {88% mineral oil, 12% dibutyl phthalate} | 30.1 | 10.5 | 40.6 |
| 2 | Blank | 76.5 | 11.0 | 87.5 |
| | 0.4% {90% mineral oil, 10% dibutyl phthalate} | 68.2 | 5.6 | 73.8 |
| 3 | 0.4% {90% mineral oil, 10% octyl alcohol} | 69.6 | 5.3 | 74.9 |
| 4 | Blank | 33.3 | 14.0 | 47.3 |
| | 0.2% {80% mineral oil, 10% dibutyl phthalate, 10% ethyl benzoate} | 26.8 | 12.0 | 38.8 |

The above tests were made on stock motors mounted on test blocks and connected to a dynamometer and utilized a regular commercial gasoline which had been pre-gummed, as a fuel. In each case a blank run was made in which all conditions were identical with the conditions of the subsequent test run except the addition of the solvent to the fuel.

The figures shown are in grams of deposit obtained from the intake systems and combustion chamber. The intake system deposit comprised all material found up to and including the intake side of the intake valves. The deposits in all cases were carefully scraped from the engine parts until the metal was bare, and were then collected and weighed. In the case of the combustion chamber deposits, the material was extracted with light petroleum fractions to eliminate irregularities due to varying amounts of oil present in the deposits.

Although the data indicate to some extent the improvement in engine conditions effected, the full extent of the beneficial results obtained can only be completely appreciated when the gum and carbon deposit decrease is considered together with the visual appearance of the intake and combustion areas, and motor performance. Photographs taken of the affected areas of the engine after blank runs and after runs made with fuel containing solvent show that the combustion zone was conspicuously improved both as to a reduction in quantity and as to character of deposit. Instead of being hard and of such a nature as would be continuously built up to such a point as would ultimately seriously interfere with engine operations, the deposit was not only reduced in quantity but was soft and flaky and parts of the metal were entirely bare, indicating that after a small amount of deposit accumulated it did not adhere to the metal and consequently passed out of the motor in the exhaust gases. A great improvement in the conditions of the intake system was also apparent from a visual inspection and photographs of the areas generally affected, particularly the intake valve ports and stems. On the blank runs the intake valve stems and guides were coated with a deposit of such a nature as to materially interfere with lubrication and to cause sticking. This condition was not present in those runs in which the solvents were used. It was also observed during the course of laboratory tests, that the engines ran much quieter, after a period of time, when operating on a fuel which contained the solvent. The difference in engine performance with and without the solvent indicates that the octane number of the fuel required to produce a given standard of performance is lowered as a result of the use of the solvent in the fuel.

Although the use of the solvent in admixture with motor fuel has been more particularly described, it is to be understood that the constituents comprising the solvent may be injected directly into the motor without previous admixture with fuel. For example, the solvent or the constituents thereof may be placed in the carburetor or injected into the head of the motor through the spark plug openings. In such cases approximately one to two ounces of solvent per cylinder may be used. It is advantageous to inject solvent periodically, for example, every thousand miles, into the motor in conjunction with the regular use of the solvent in the fuel and thereby take care of the removal of any deposits they may collect from time to time.

The solvent is also useful in admixture with lubricating oil both for use in internal combustion engines and industrial machinery. When admixed with lubricating oil, the solvent should be used in amounts of 1% to 5% by volume of the oil. When used with motor oils, deposits of carbon on piston rings is largely removed and minimized. When used in industrial lubricating oils, for example, for use in lubricating spindles, gum deposition is largely avoided.

The foregoing general description of the invention and the specific examples described are sufficient to enable one skilled in the art to appreciate its value. The invention is not limited to the specific examples disclosed or to any particular theory or mechanism of the action of the gasoline additive but is to be interpreted as broadly as the prior art permits in view of the following claims.

We claim:

1. A composition for use as a gum solvent comprising 50% to 90% refined mineral oil boiling above the boiling range of kerosene and 50% to 10% of a mixture of esters of phthalic and benzoic acids, which esters boil above 350° F.

2. A motor fuel comprising hydrocarbons boiling within the gasoline boiling range containing from 0.1% to 5% of refined mineral oil boiling above the kerosene boiling range and a mixture of esters of phthalic and benzoic acids boiling above 350° F., said mineral oil and said esters being present in a ratio by volume ranging from 50% to 90% of the former to 50% to 10% of the latter.

3. A method of removing from and minimizing gum and carbon deposits on mechanical parts which comprises bringing in contact with said deposits the following ingredients in the following proportions by volume: refined mineral oil boiling above the kerosene boiling range, 50% to 90%; mixture of esters of phthalic and benzoic acids boiling above 350°, 50% to 10%.

4. A composition for use as a gum solvent comprising 50% to 90% refined mineral oil boiling above the boiling range of kerosene and 50% to 10% of a mixture of dibutyl phthalate and ethyl benzoate.

5. A motor fuel comprising hydrocarbons boiling within the gasoline boiling range containing from 0.1% to 5% of refined mineral oil boiling above the kerosene boiling range and a mixture of dibutyl phthalate and ethyl benzoate, said mineral oil and said esters being present in a ratio by volume ranging from 50% to 90% of the former to 50% to 10% of the latter.

6. A motor fuel in accordance with claim 5 and containing a mixture of the following materials in approximately the following proportions: refined mineral oil 80%, dibutyl phthalate 10%, ethyl benzoate 10%.

7. A method of removing from and minimizing gum and carbon deposits on mechanical parts which comprises bringing in contact with said deposits the following ingredients in the following proportions by volume: refined mineral oil boiling above the kerosene boiling range, 50% to 90%; mixture of dibutyl phthalate and ethyl benzoate, 50% to 10%.

8. A method in accordance with claim 7 where the ingredients consist of the following materials in approximately the following proportions: refined mineral oil 80%, dibutyl phthalate 10%, ethyl benzoate 10%.

9. A composition for use as a gum solvent comprising approximately 80% of refined mineral oil boiling above the boiling range of kerosene, 10% dibutyl phthalate and 10% ethyl benzoate.

WILLIAM J. BACKOFF.
NORMAN D. WILLIAMS.
JOHN F. O'LOUGHLIN.
HARRY L. MOIR.
JOHN S. YULE.